US012764585B2

(12) United States Patent
Jiang

(10) Patent No.: US 12,764,585 B2
(45) Date of Patent: Oct. 13, 2026

(54) SERVING CELL MEASUREMENT METHOD AND APPARATUS THEREOF

(71) Applicant: Beijing Xiaomi Mobile Software Co., Ltd., Beijing (CN)

(72) Inventor: Xiaowei Jiang, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 368 days.

(21) Appl. No.: 18/681,249

(22) PCT Filed: Aug. 5, 2021

(86) PCT No.: PCT/CN2021/111040
§ 371 (c)(1),
(2) Date: Feb. 5, 2024

(87) PCT Pub. No.: WO2023/010475
PCT Pub. Date: Feb. 9, 2023

(65) Prior Publication Data
US 2024/0314618 A1 Sep. 19, 2024

(51) Int. Cl.
*H04W 24/10* (2009.01)
*H04W 36/00* (2009.01)

(52) U.S. Cl.
CPC ....... *H04W 24/10* (2013.01); *H04W 36/0083* (2013.01)

(58) Field of Classification Search
CPC .......................... H04W 24/10; H04W 36/0083
(Continued)

(56) References Cited

U.S. PATENT DOCUMENTS

2012/0300657 A1* 11/2012 Jung ..................... H04W 24/10 370/252
2015/0189627 A1* 7/2015 Yang ......................... H04L 5/14 370/280

(Continued)

FOREIGN PATENT DOCUMENTS

CN 105490789 A 4/2016
CN 110915252 A 3/2020
CN 111901837 A 11/2020

OTHER PUBLICATIONS

International Search Report and Written Opinion of International Application No. PCT/CN2021/111040, dated Mar. 28, 2022, 12 pages.

(Continued)

*Primary Examiner* — Chi Tang P Cheng
(74) *Attorney, Agent, or Firm* — Finnegan, Henderson, Farabow, Garrett & Dunner, L.L.P.

(57) ABSTRACT

A method for serving cell measurement is performed by a terminal device, and includes: determining a serving cell of the terminal device, wherein the serving cell is configured with a plurality of physical cells; and performing at least one of following operations according to the plurality of physical cells configured for the serving cell: measuring a physical cell, which meets a condition, selected from the plurality of physical cells; assessing a measurement event of a physical cell, which meets a condition, selected from the plurality of physical cells; or reporting a measurement result of a physical cell, which meets a condition, selected from the plurality of physical cells.

15 Claims, 5 Drawing Sheets

(58) Field of Classification Search
USPC .......................................................... 370/252
See application file for complete search history.

(56) References Cited

U.S. PATENT DOCUMENTS

| | | | |
|---|---|---|---|
| 2016/0205575 | A1 | 7/2016 | Jung et al. |
| 2018/0026803 | A1 | 1/2018 | Fujishiro et al. |
| 2021/0105649 | A1 | 4/2021 | Lee |

OTHER PUBLICATIONS

First Office Action issued by the State Intellectual Property Office of People's Republic of China on Oct. 28, 2024, in corresponding Application No. CN 202180002392.3, 10 pages.
Office Action issued by the Patent Office of the Russian Federation Federal Institute of Industrial Property on Sep. 24, 2024, in corresponding Application No. RU 2024105552/07, 8 pages.
Extended European Search Report Issued in Application No. 21952359.4 dated Sep. 19, 2024, 11 pages.
Notice of Reasons for Refusal issued by the Japanese Patent Office on Jan. 23, 2025, in corresponding Application No. JP 2024-506894, 10 pages.

* cited by examiner

SERVING CELL MEASUREMENT METHOD AND APPARATUS THEREOF

CROSS REFERENCE TO RELATED APPLICATION

This application is a US national phase application of International Application No. PCT/CN2021/111040, filed on Aug. 5, 2021, the entire content of which is hereby incorporated by reference.

TECHNICAL FIELD

The disclosure relates to a field of communication technologies, and particularly to a method for serving cell measurement and an apparatus thereof.

BACKGROUND

In a communication system, one serving cell may be configured to be associated with a plurality of physical cells, and different physical cells may have their own corresponding physical channels. When one serving cell of a terminal device is configured to be associated with the plurality of physical cells, how to measure and report the plurality of physical cells of the serving cell by the terminal device causing the terminal device and the network device to maintain a consistent understanding for measurement of the plurality of physical cells associated with the serving cell has become an urgent problem to be solved.

SUMMARY

In a first aspect, an embodiment of the present disclosure provides a method for serving cell measurement. The method is performed by a terminal device, and includes: determining a serving cell of the terminal device, in which, the serving cell is configured with a plurality of physical cells; and performing at least one of following operations according to the plurality of physical cells configured for the serving cell: measuring a physical cell, which meets a condition, selected from the plurality of physical cells; or assessing a measurement event of a physical cell, which meets a condition, selected from the plurality of physical cells; or reporting a measurement result of a physical cell, which meets a condition, selected from the plurality of physical cells. In a second aspect, an embodiment of the present disclosure provides a method for serving cell measurement. The method is performed by a network device, and includes: sending serving cell measurement objects of a serving cell to a terminal device, in which, the serving cell is configured with a plurality of physical cells; and receiving a measurement result reported by the terminal device.

In a third aspect, an embodiment of the present disclosure provides a communication apparatus. The communication apparatus includes a processor and a memory having a computer program stored thereon. The processor is configured to determine a serving cell of the terminal device, in which, the serving cell is configured with a plurality of physical cells; and perform at least one of following operations according to the plurality of physical cells configured for the serving cell: measuring a physical cell, which meets a condition, selected from the plurality of physical cells; or assessing a measurement event of a physical cell, which meets a condition, selected from the plurality of physical cells; or reporting a measurement result of a physical cell, which meets a condition, selected from the plurality of physical cells.

BRIEF DESCRIPTION OF THE DRAWINGS

The accompanying drawings of the present disclosure will be briefly described below.

DETAILED DESCRIPTION

For ease of understanding, terms related to the present disclosure are introduced first.

1. Physical Channel

Physical Uplink Shared Channel (PUSCH)

The PUSCH may be configured to carry and transmit data from an uplink shared channel (USCH).

Physical Downlink Shared Channel (PDSCH)

The PDSCH may be configured to carry and transmit data from a downlink shared channel (DSCH).

Physical Uplink Control Channel (PUCCH)

The PUCCH may be configured to carry uplink control information. Physical downlink control channel (PDCCH)

The PDCCH may be configured to carry downlink control information (DCI).

In order to better understand a method for serving cell measurement proposed in an embodiment of the present disclosure, a communication system used in an embodiment of the present disclosure will be described below.

Figure 1:
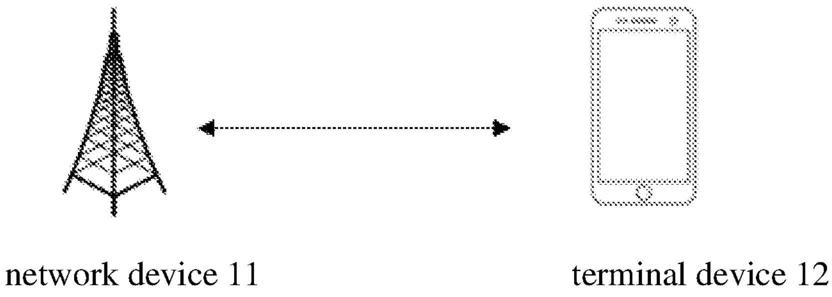
FIG. 1 is a schematic diagram illustrating an architecture of a communication system provided in an embodiment of the present disclosure.

Please referring to FIG. 1, FIG. 1 is a schematic diagram illustrating an architecture of a communication system provided in an embodiment of the present disclosure. The communication system may include, but is not limited to, a network device and a terminal device. Numbers and forms of the devices as illustrated in FIG. 1 are for example only and do not constitute a limitation to embodiments of the present disclosure. In practical applications, the system may include two or more network devices or two or more terminal devices. The communication system as illustrated in FIG. 1 takes including one network device 11 and one terminal device 12 as an example.

It should be noted that the technical solution of embodiments of the present disclosure may be applied to various communication systems, for example, a long term evolution (LTE) system, a 5th generation (5G) mobile communication system, a 5G new radio (NR) system, or other future new mobile communication systems.

The network device 11 in embodiments of the present disclosure is a physical device for transmitting or receiving signals at a network side. For example, the network device 101 may be an evolved NodeB (eNB), a transmission reception point (TRP), a next generation NodeB (gNB) in an NR system, base stations in other future mobile communication systems, or access nodes in wireless fidelity (WiFi) systems. A specific technology and a specific device form adopted by the network device are not limited in embodiments of the present disclosure. The network device provided in embodiments of the present disclosure may be composed of a central unit (CU) and a distributed unit (DU). The CU may also be referred to as a control unit. A CU-DU structure may be adopted to separate protocol layers of the network device, such as a base station. Functions of some protocol layers may be controlled centrally by the CU, and functions of the remaining or all protocol layers may be distributed within the DU which is centrally controlled by the CU.

The terminal device 12 in embodiments of the present disclosure is a physical device for receiving or transmitting signals at a user side, such as a mobile phone. The terminal device may also be referred to as a terminal, a user equipment (UE), a mobile station (MS), a mobile terminal (MT), etc. The terminal device may be a vehicle with a communication feature, a smart vehicle, a mobile phone, a wearable device, a pad, a computer with a wireless transceiver feature, a virtual reality (VR) terminal, an augmented reality (AR) terminal, a wireless terminal in industrial control, and a wireless terminal in self-driving, a wireless terminal in remote medical surgery, a wireless terminal in smart grid, a wireless terminal in transportation safety, a wireless terminal in smart city, and a wireless terminal in smart home, etc. A specific technology and a specific device form adopted by the terminal device 12 are not limited in embodiments of the present disclosure.

It can be understood that the communication system described in embodiments of the present disclosure is intended to provide a clearer explanation of the technical solution of embodiments of the present disclosure, and does not constitute a limitation on the technical solution proposed in embodiments of the present disclosure. As those ordinary skilled in the art known, with evolution of the system architecture and emergence of new business scenarios, the technical solution proposed in embodiments of the present disclosure is also applicable to the similar technical problem.

A method for serving cell measurement and an apparatus thereof provided in the present disclosure are described in detail with reference to the accompany drawings below.

Figure 2:
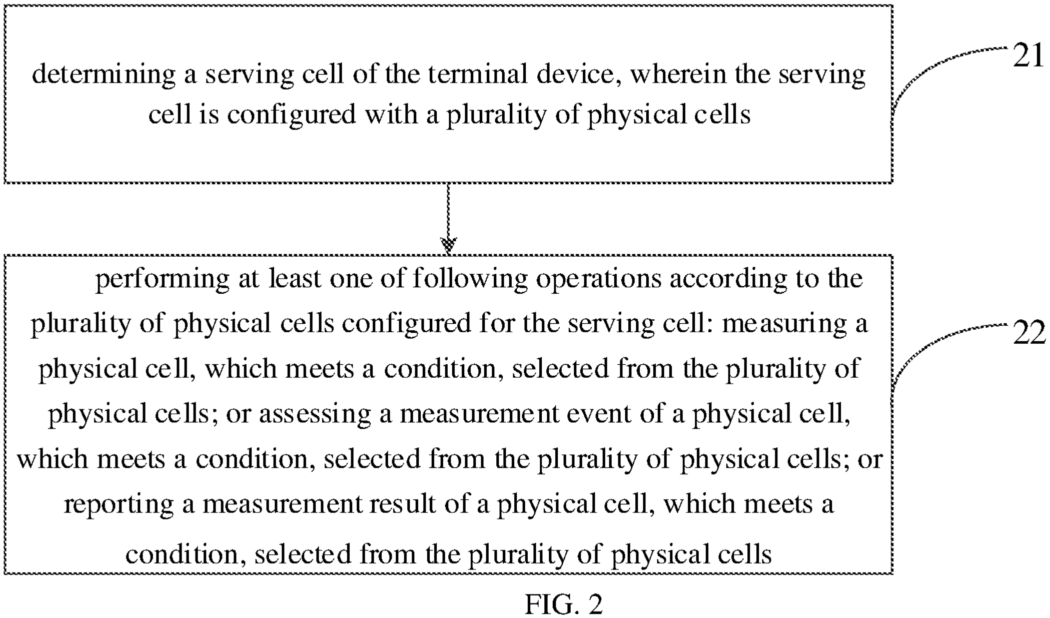
FIG. 2 is a flowchart illustrating a method for serving cell measurement according to an embodiment of the present disclosure.

Please referring to FIG. 2, FIG. 2 is a flowchart illustrating a method for serving cell measurement according to an embodiment of the present disclosure. The method may be performed by a terminal device. As illustrated in FIG. 2, the method may include, but is not limited to, the following blocks.

At block 21, a serving cell of the terminal device is determined. The serving cell is configured with a plurality of physical cells.

In some embodiments, the serving cell of the terminal device may be determined based on identifier information of the serving cell.

In some embodiments, the identifier information of the serving cell may be: a serving cell identifier. For example, the serving cell identifier may be serving cell 1, or serving cell 2, etc. The present disclosure does not limit to this.

In some embodiments, the identifier information of the serving cell may also be: a cell group identifier. For example, the cell group identifier may be a master cell group (MCG), or a secondary cell group (SCG), etc. The present disclosure does not limit to this.

In some embodiments, the identifier information of the serving cell may also be: a cell type identifier. For example, the cell type identifier may be a primary cell (PCell), a primary secondary cell (PSCell), a secondary cell (SCell), etc. The present disclosure does not limit to this.

In some embodiments, in a case where a cell type is SCell, the present disclosure may also provide an SCell identifier, such as SCell 1, etc. The present disclosure does not limit to this.

At block 22, at least one of following operations is performed according to the plurality of physical cells configured for the serving cell: measuring a physical cell, which meets a condition, selected from the plurality of physical cells; or assessing a measurement event of a physical cell, which meets a condition, selected from the plurality of physical cells; or reporting a measurement result of a physical cell, which meets a condition, selected from the plurality of physical cells.

In some embodiments, the physical cell which meets the condition may be a physical cell specified through a configuration of a network device.

For example, when the terminal device determines the serving cell as a serving cell 1, and obtains that the specified physical cell is the serving cell 1 based on the configuration of the network device, the terminal device may measure the serving cell 1, alternatively, the terminal device may assess a measurement event of the physical cell 1, alternatively, the terminal device may report a measurement event of the physical cell 1.

In some embodiments, the physical cell which meets the condition may be a physical cell agreed in a protocol.

The physical cell agreed in the protocol is an activated physical cell, or a physical cell with one or more physical channels being activated, etc. The present disclosure does not limit to this.

For example, the agreed protocol includes that the physical cell which meets the condition is an activated physical cell. When the terminal device determines that a physical cell 1 is the activated physical cell in the plurality of physical cells configured for and associated with the serving cell 1, the terminal device may measure the physical cell 1, alternatively, the terminal device may assess the measurement event of the physical cell 1, alternatively, the terminal device may report the measurement event of the physical cell 1.

It should be noted that the above illustrations are only explanations with examples and cannot be used as limitations on the serving cell, the physical cell, and operations performed in embodiments of the present disclosure.

With implementing embodiments of the present disclosure, the terminal device may first determine the serving cell, and perform at least one of the following operations according to the plurality of physical cells configured for the serving cell: measuring the physical cell, which meets the condition, selected from the plurality of physical cells; or assessing the measurement event of the physical cell, which meets the condition, selected from the plurality of physical cells; or reporting the measurement result of the physical cell, which meets the condition, selected from the plurality of physical cells. Therefore, the present disclosure may cause the terminal device and the network device to maintain a consistent understanding for measurement of the physical cells associated with the serving cell of the terminal device, which may provide a guarantee for a smooth and steady communication transmission.

Figure 3:
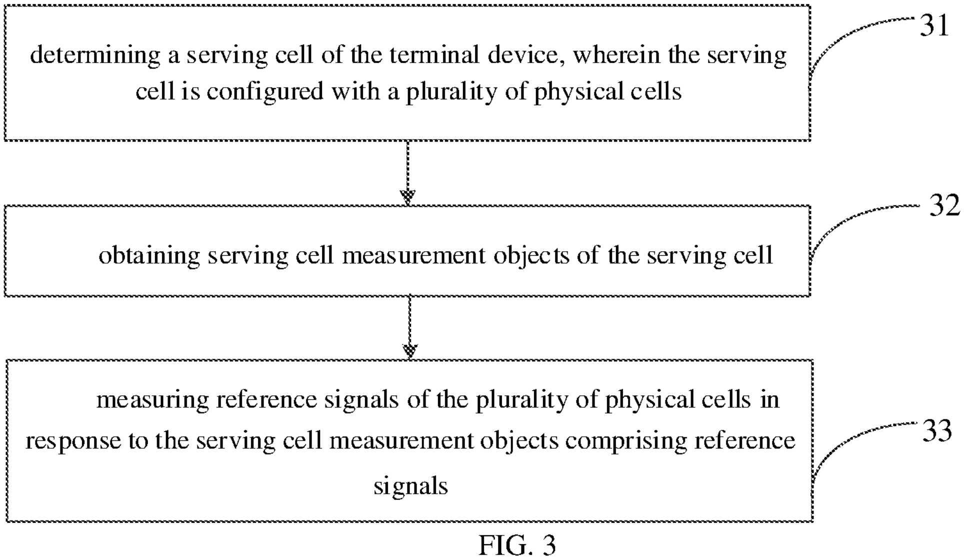
FIG. 3 is a flowchart illustrating a method for serving cell measurement according to another embodiment of the present disclosure.

Please referring to FIG. 3, FIG. 3 is a flowchart illustrating a method for serving cell measurement according to an embodiment of the present disclosure. The method may be performed by a terminal device. As illustrated in FIG. 3, the method may include, but is not limited to, the following blocks.

At block 31, a serving cell of the terminal device is determined. The serving cell is configured with a plurality of physical cells.

It is noted that specific contents and implementations of block 31 may refer to explanations of other respective embodiments of the present disclosure, which will be repeated hereinafter.

At block 32, serving cell measurement objects of the serving cell are obtained.

In some embodiments, the serving cell measurement objects (servingCellMOs) may include reference signal information for measurement. The present disclosure is not limited to this.

It can be understood that in an embodiment of the present disclosure, the terminal device may obtain the serving cell measurement objects of the serving cell based on a configuration of a network device, received indication information sent by the network device, or an agreed protocol. The present disclosure is not limited to this.

In some embodiments, reference signal information may include measuring a frequency point. For example, the frequency point may be an absolute radio frequency channel number 1 (ARFCN 1), etc. The present disclosure is not limited to this.

In some embodiments, the reference signal information may include measuring a type of a reference signal. For example, the type of the reference signal may be a synchronous signal block (SSB), or may also be a channel state information reference signal (CSI RS), etc., which is not limited in the present disclosure.

At block 33, reference signals of the plurality of physical cells are measured in response to the serving cell measurement objects including reference signals.

For example, when the terminal device determines that the serving cell measurement object of the serving cell 1 is servingcellMO 1, the terminal device may measure the reference signals of the plurality of physical cells associated with the serving cell 1, etc., which is not limited in the present disclosure.

In some embodiments, no measurement is performed on a reference signal of an unactivated physical cell in response to the serving cell measurement objects including a reference signal of one or more physical cells.

In some embodiments, the unactivated physical cell may include: a physical cell being not activated or enabled; or one or more physical channels corresponding to a physical cell being not activated or enabled, etc., which is not limited in the present disclosure.

For example, the serving cell 1 is configured to be associated with a physical cell 1 and a physical cell 2, and the serving cell measurement objects of the serving cell 1 is a reference signal of the physical cell 2. If the physical cell 2 is not activated, the terminal device does not measure the reference signal of the physical cell 2, etc. This present disclosure does not limit this.

Correspondingly, for an activated physical cell, the terminal device may measure a reference signal of the activated physical cell.

Alternatively, if one or more physical channels corresponding to the physical cell are not activated, the terminal device does not measure the reference signal of the unactivated physical cell.

For example, the serving cell 1 is configured to be associated with a physical cell 1 and a physical cell 2, the serving cell measurement object is a reference signal of the physical cell 2, and the physical cell 2 is configured with corresponding physical channels PDCCH 2 and PDSCH 2. In response to both PDCCH 2 and PDSCH 2 being not activated, the terminal device does not measure the reference signal of the physical cell 2.

Correspondingly, for a physical cell corresponding to an activated or enabled physical channel, the terminal device may measure the reference signal of the physical cell.

In some embodiments, in response to the serving cell measurement objects including reference signals of one or more physical cells, no measurement is performed for an unactivated physical cell in the one or more physical cells corresponding to the serving cell measurement objects.

For example, the serving cell 1 is configured to be associated with the physical cell 1 and the physical cell 2, and the serving cell measurement objects are a reference signal of the physical cell 1 and a reference signal of the physical cell 2. In response to the physical cell 2 being not activated, the terminal device does not measure the physical cell 2, etc. The present disclosure does not limit this.

In some embodiments, in a case where the serving cell of the terminal device corresponds to a plurality of serving cell measurement objects, the physical cell, which meets the condition, corresponding to a measurement object of an activated serving cell may be measured.

For example, the terminal device determines that the serving cell measurement objects configured for the serving cell 1 are: a serving cell measurement object 1 and a serving cell measurement object 2. When the serving cell measurement object 1 is activated and the serving cell measurement object 2 is not activated, the terminal device may measure the reference signal corresponding to the serving cell measurement object 1. The present disclosure does not limit this.

With implementing embodiments of the present disclosure, the terminal device may first determine the serving cell, and then obtains the serving cell measurement objects of the serving cell. The reference signals of the plurality of physical cells may be measured in response to the serving cell measurement objects include the reference signals. Therefore, the present disclosure may cause the terminal device and the network device to maintain a consistent understanding for measurement of the physical cells associated with the serving cell of the terminal device, which may provide a guarantee for a smooth and steady communication transmission.

Figure 4:
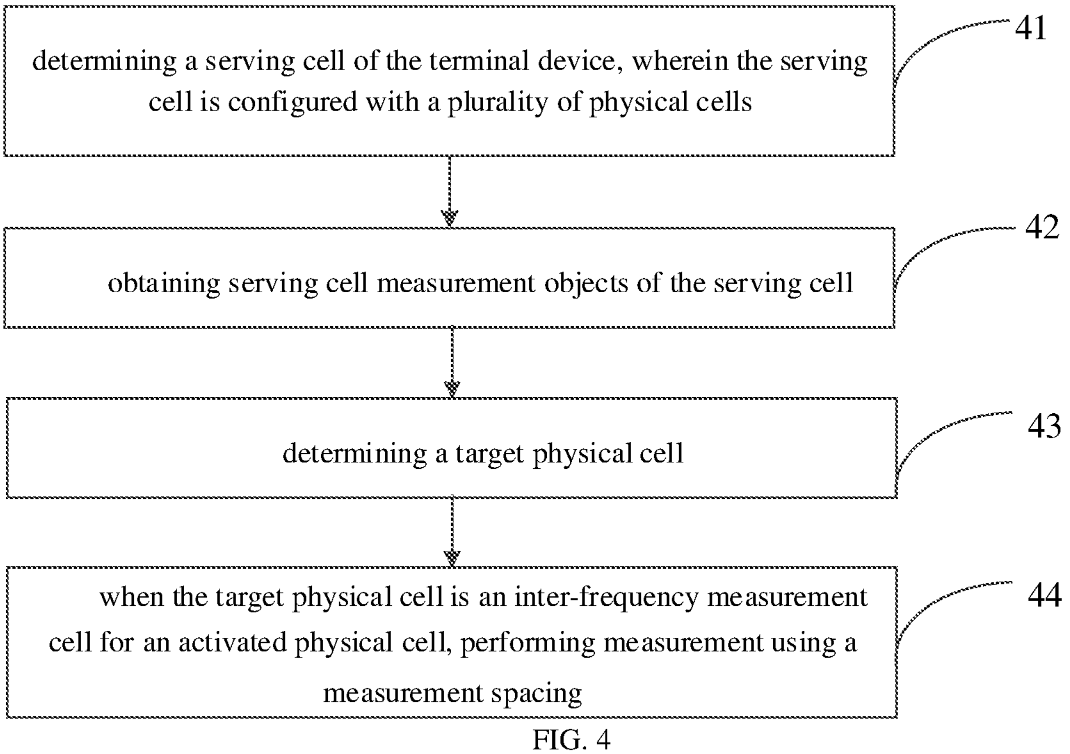
FIG. 4 is a flowchart illustrating a method for serving cell measurement according to another embodiment of the present disclosure.

Please referring to FIG. 4, FIG. 4 is a flowchart illustrating a method for serving cell measurement according to an embodiment of the present disclosure. The method may be performed by a terminal device. As illustrated in FIG. 4, the method may include, but is not limited to, the following blocks.

At block 41, a serving cell of the terminal device is determined. The serving cell is configured with a plurality of physical cells.

At block 42, serving cell measurement objects of the serving cell are obtained.

It is noted that specific contents and implementations of blocks 41 and 42 may refer to explanations of other respective embodiments of the present disclosure, which will be repeated hereinafter.

At block 43, a target physical cell is determined.

In some embodiments, the terminal device may determine the target physical cell according to identifier information of the physical cell.

The identifier information of the physical cell may include a physical cell identifier (PCI).

In some embodiments, the identifier information of the physical cell may also include frequency point information of the physical cell.

A frequency point of the physical cell may be explicitly or implicitly indicated. The present disclosure is not limited to this.

For example, the terminal device determines that the serving cell 1 is configured to be associated with a physical cell 1 and a physical cell 2, and then determines a frequency point of the physical cell 1 to be f1 and a frequency point of the physical cell 2 to be f2 based on a configuration of a network device.

Alternatively, the terminal device determines that the serving cell 1 is configured to be associated with the physical cell 1 and the physical cell 2, and then determines the frequency point of the physical cell 1 to be f1 and does not configure the frequency point of the physical cell 2 based on the configuration of the network device. The terminal device may determine that the frequency point of the physical cell 2 is the same as the frequency point of the physical cell 1 according to a protocol agreement.

Alternatively, the terminal device determines that the serving cell 1 is configured to be associated with the physical cell 1 and the physical cell 2, and then determines a frequency point of the serving cell 1 to be f1 and does not configure the frequency points of the physical cell 1 and the physical cell 2 based on the configuration of the network device. The terminal device may determine that the frequency points of the physical cell 1 and the physical cell 2 are the same as the frequency point of the serving cell 1 according to a protocol agreement.

It should be noted that the above illustrations are only explanations with examples and cannot be used as limitations on the method of determining the frequency point information of the serving cell in embodiments of the present disclosure.

At block 44, when the target physical cell is an inter-frequency measurement cell for an activated physical cell, measurement is performed using a measurement spacing.

In some embodiments, when a frequency point of the target physical cell is different from a frequency point of the activated physical cell, it may be determined that the target physical cell is the inter-frequency measurement cell.

In some embodiments, when a bandwidth of the target physical cell is different from a bandwidth of the activated physical cell, it may be determined that the target physical cell is the inter-frequency measurement cell.

In some embodiments, when a subcarrier spacing of the target physical cell is different from a subcarrier spacing of the activated physical cell, it may be determined that the target physical cell is the inter-frequency measurement cell.

It can be understood that when the target physical cell and the activated physical cell meet one or more of the above conditions, for example, frequency points and bandwidths of both cells are different, or frequency points, bandwidths, and subcarrier spacings of both cells are different, it may also be determined that the target physical cell is the inter-frequency measurement cell.

In addition, the measurement spacing can be configured by the network device or agreed by the protocol. The present disclosure is not limited to this.

For example, the agreed protocol includes that the terminal device measures at its own determined measurement spacing. If the measurement spacing of the terminal device is T, the terminal device may measure the target cell according to the measurement spacing T, etc. The present disclosure does not limit to this.

In some embodiments, when the target physical cell is the inter-frequency measurement cell for the activated physical cell, and a frequency point of the target physical cell belongs to a same frequency type as a frequency point of the activated physical cell, measurement is performed using a measurement spacing corresponding to the frequency type.

For example, when both the target physical cell and the activated physical cell 1 are the inter-frequency measurement cells, and the frequency points of both the target physical cell and the activated physical cell 1 are within a frequency range 1 (FR1), the terminal device may measure the target physical cell using a measurement spacing corresponding to the FR1, etc. The present disclosure does not limit to this.

With implementing embodiments of the present disclosure, the terminal device may first determine the serving cell, and then obtains the serving cell measurement objects of the serving cell, determines the target physical cell, and performing the measurement using the measurement spacing when the target physical cell is the inter-frequency measurement cell for the activated physical cell. Therefore, the present disclosure may cause the terminal device and the network device to maintain a consistent understanding for measurement of the physical cells associated with the serving cell of the terminal device, which may provide a guarantee for a smooth and steady communication transmission.

Figure 5:
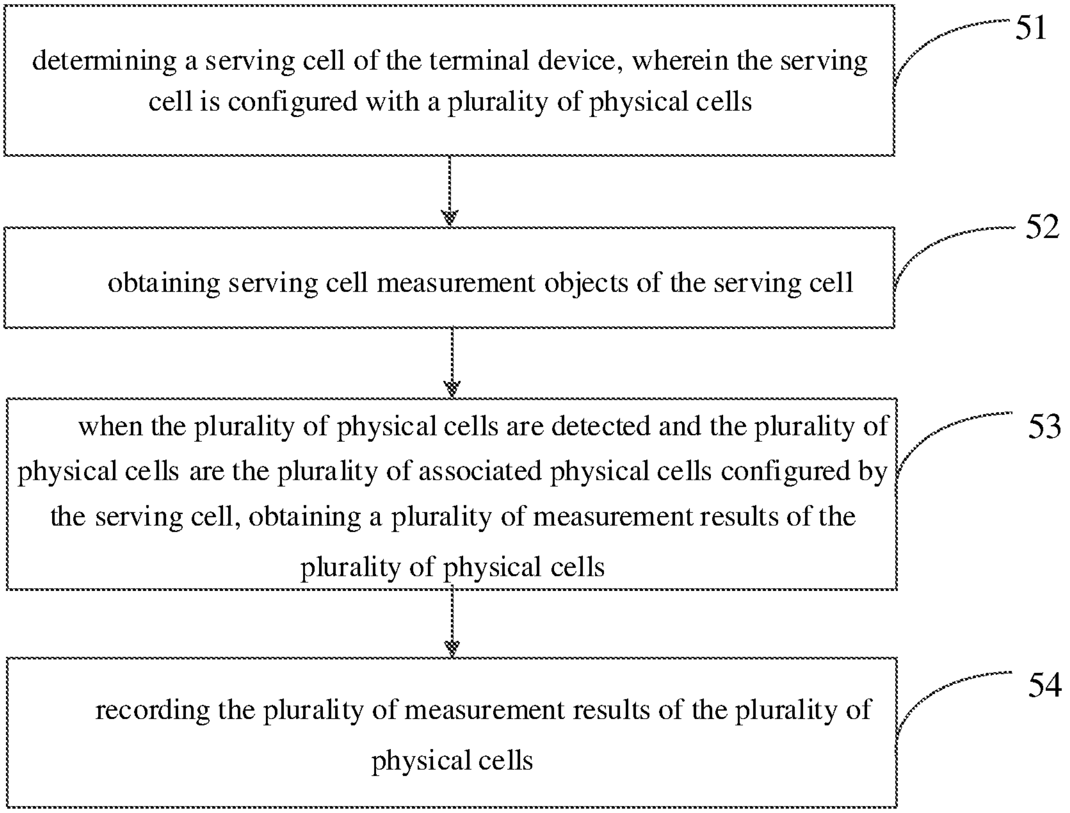
FIG. 5 is a flowchart illustrating a method for serving cell measurement according to another embodiment of the present disclosure.

Please referring to FIG. 5, FIG. 5 is a flowchart illustrating a method for serving cell measurement according to an embodiment of the present disclosure. The method may be performed by a terminal device. As illustrated in FIG. 5, the method may include, but is not limited to, the following blocks.

At block 51, a serving cell of the terminal device is determined. The serving cell is configured with a plurality of physical cells.

At block 52, serving cell measurement objects of the serving cell are obtained.

It is noted that specific contents and implementations of blocks 51 and 52 may refer to explanations of other respective embodiments of the present disclosure, which will be repeated hereinafter.

At block 53, when the plurality of physical cells are detected and the plurality of physical cells are the plurality of associated physical cells configured by the serving cell, a plurality of measurement results of the plurality of physical cells are obtained.

It can be understood that the terminal device may detect the plurality of physical cells during detection. The plurality of detected physical cells may correspond to the same serving cell or different serving cells, which is not limited in the present disclosure.

Therefore, in an embodiment of the present disclosure, the terminal device may further determine the serving cell corresponding to respective physical cells in response to detecting the plurality of physical cells.

For example, the terminal device detects a physical cell 1, a physical cell 2, and a physical cell 3, and determines that the physical cell 1, the physical cell 2, and the physical cell 3 are physical cells configured for and associated with the serving cell 1, then may obtain measurement results corresponding to the physical cell 1, the physical cell 2, and the physical cell 3, respectively. The present disclosure does not limit to this.

In some embodiments, the plurality of measurement results of the plurality of physical cells may include cell level measurement results; or measurement results of beams corresponding to cells, etc. The present disclosure does not limit to this.

There may be various cell level measurement results.

For example, for the physical cell PCI 1, the cell level measurement result may be a reference signal received power (RSRP) of PCI 1, or a reference signal received quality (RSRQ) of PCI 1, or a signal to interference and noise ratio (INR), etc. The present disclosure does not limit to this.

It can be understood that the cell level measurement results can be one or more of the above items. The present disclosure does not limit to this.

In addition, there may be various measurement results of beams corresponding to cells.

For example, for a beam 1 under physical cell PCI 1, the measurement result may be a RSRP of the beam 1 under PCI 1, or may also be a RSRQ of the beam 1 under PCI 1, or may also be an SINR of the beam 1 under PCI 1, etc. The present disclosure does not limit to this.

It can be understood that the measurement results of beams corresponding to cells can be one or more of the above items. The present disclosure does not limit to this.

In some embodiments, an identifier of the beam corresponding to the cell may include an SSB identifier, or may also include a CSI RS identifier, or may also include the SSB identifier and the CSI RS identifier, etc. The present disclosure does not limit to this.

At block 54, the plurality of measurement results of the plurality of physical cells are recorded.

In some embodiments, the terminal device may record the plurality of measurement results respectively.

For example, the physical cells configured and associated with the serving cell 1 are: the physical cell 1, the physical cell 2, and the physical cell 3. In response to a measurement result of the physical cell 1 being a measurement result 1, a measurement result of the physical cell 2 being a measurement result 2, and a measurement result of physical cell 3 being a measurement result 3, the terminal device may record the above three measurement results respectively, that is, the measurement result of the serving cell 1 may include the measurement results corresponding to the above three physical cells respectively. The present disclosure does not limit to this.

In some embodiments, the terminal device may also merge the plurality of measurement results to generate and record a measurement result of the serving cell.

Specifically, an average value of the measurement results corresponding to the plurality of physical cells may be obtained to generate the measurement result of the serving cell.

For example, the physical cells configured and associated with the serving cell 1 are: the physical cell 1 and the physical cell 2. In response to the measurement result of the physical cell 1 being the measurement result 1, and the measurement result of the physical cell 2 being the measurement result 2, the terminal device may obtain an average value of the measurement result 1 and the measurement result 2 after adding the measurement result 1 and the measurement result 2, and take the average value as the measurement result of the serving cell 1.

It should be noted that the above illustrations are only explanations with examples and cannot be used as limitations on the serving cell, the physical cell, and the method of generating the measurement result of the serving cell in embodiments of the present disclosure.

Alternatively, the terminal device may obtain an average value of measurement results corresponding to the plurality of physical cells with measurement results exceeding a threshold.

The threshold may be configured by the network device, or agreed a protocol. The present disclosure does not limit to this.

For example, the physical cells configured and associated with the serving cell 1 are: the physical cell 1, the physical cell 2, and the physical cell 3. The measurement result of the physical cell 1 is the measurement result 1, the measurement result of the physical cell 2 is the measurement result 2, and the measurement result of physical cell 3 is the measurement result 3, and the threshold is T1. In response to the measurement result 1 of the physical cell 1 and the measurement result 2 of the physical cell 2 being greater than the threshold T1, the terminal device may obtain the average value of the measurement result 1 and the measurement result 2 after adding the measurement result 1 and the measurement result 2, and take the average value as the measurement result of the serving cell 1.

It should be noted that the above illustrations are only explanations with examples and cannot be used as limitations on the serving cell, the physical cell, and the method of generating the measurement result of the serving cell in embodiments of the present disclosure.

In some embodiments, when the terminal device detects the plurality of physical cells, the terminal device may determine the measurement results corresponding to the physical cells configured in the network device or agreed in the protocol as the measurement result of the serving cell.

For example, the serving cell 1 is configured with a measurement event A1, and the physical cells configured and associated with the serving cell 1 are the physical cell 1 and the physical cell 2. In response to the physical cell configured in the network device or agreed in the protocol being the physical cell 1, the measurement result of the physical cell 1 may be determined as the measurement result of the serving cell 1 in the measurement event A1, etc. The present disclosure does not limit to this.

It should be noted that for determination of the measurement results of the serving cell in any measurement event, the method may refer to the above measurement event A1, which will not be repeated here.

In some embodiments, the physical cell agreed in the protocol may be an activated physical cell, or may be a physical cell with one or more physical channels being activated, etc. The present disclosure is not limited to this.

Therefore, when the physical cell agreed in the protocol is activated, the measurement result corresponding to the physical cell may be determined as the measurement result corresponding to the serving cell. Alternatively, when one or more physical channels corresponding to the physical cell agreed in the protocol are activated, the measurement results corresponding to the physical cells can be used as the measurement result corresponding to the serving cell, etc. The present disclosure is not limited to this.

With implementing embodiments of the present disclosure, the terminal device may first determine the serving cell, and then obtains the serving cell measurement objects of the serving cell. When the plurality of physical cells are detected and the plurality of physical cells are the plurality of associated physical cells configured by the serving cell, the terminal device may obtain the plurality of measurement results of the plurality of physical cells, and record the plurality of measurement results of the plurality of physical cells. Therefore, the present disclosure may cause the terminal device and the network device to maintain a consistent understanding for measurement of the physical cells associated with the serving cell of the terminal device, which may provide a guarantee for a smooth and steady communication transmission.

Figure 6:
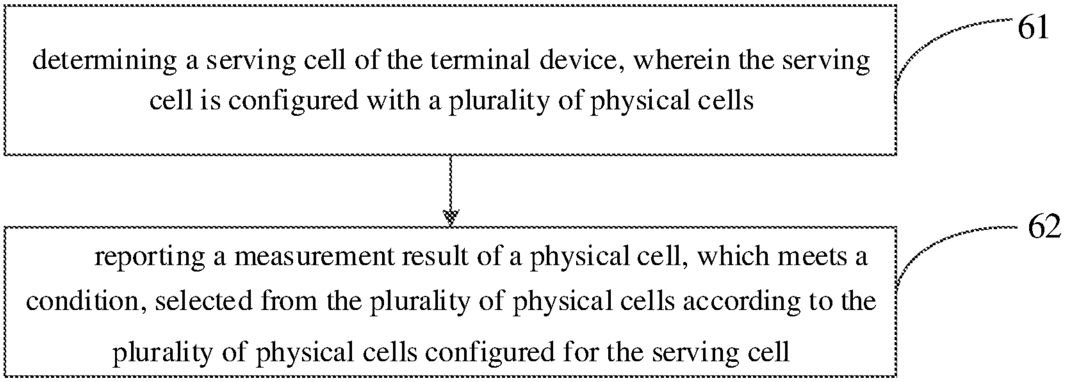
FIG. 6 is a flowchart illustrating a method for serving cell measurement according to another embodiment of the present disclosure.

Please referring to FIG. 6, FIG. 6 is a flowchart illustrating a method for serving cell measurement according to an embodiment of the present disclosure. The method may be performed by a terminal device. As illustrated in FIG. 6, the method may include, but is not limited to, the following blocks.

At block 61, a serving cell of the terminal device is determined. The serving cell is configured with a plurality of physical cells.

It is noted that specific contents and implementations of block 61 may refer to explanations of other respective embodiments of the present disclosure, which will be repeated hereinafter.

At block 62, a measurement result of a physical cell, which meets a condition, selected from the plurality of physical cells is reported according to the plurality of physical cells configured for the serving cell.

In some embodiments, a measurement result of an activated physical cell among physical cells associated with the serving cell may be reported.

For example, the physical cells configured and associated with the serving cell 1 are the physical cell 1 and the physical cell 2. The measurement result of the physical cell 1 is the measurement result 1, and the measurement result of the physical cell 2 is the measurement result 2. In response to the physical cell 1 being activated, the terminal device may report the measurement result 1 of the physical cell 1, etc. The present disclosure is not limited to this.

In some embodiments, a measurement result of a physical cell with a corresponding physical channel being activated among the physical cells associated with the serving cell may be reported.

For example, the physical cells configured and associated with the serving cell 1 are the physical cell 1 and the physical cell 2. The measurement result of the physical cell 1 is the measurement result 1, and the measurement result of the physical cell 2 is the measurement result 2. In response to the physical channel 2 corresponding to the physical cell 2 being activated, the terminal device may report the measurement result 2 of the physical cell 2, etc. The present disclosure is not limited to this.

In some embodiments, a plurality of measurement results corresponding to the plurality of physical cells associated with the serving cell are reported respectively.

For example, the physical cells configured and associated with the serving cell 1 are the physical cell 1 and the physical cell 2. The measurement result of the physical cell 1 is the measurement result 1, and the measurement result of the physical cell 2 is the measurement result 2. The terminal device may report the measurement result 1 of the physical cell 1 and the measurement result 2 of the physical cell 2, respectively, etc. The present disclosure is not limited to this.

In some embodiments, a measurement result of the physical cell specified by a measurement indication may be reported according to the measurement indication received.

The measurement indication may be configured by the network device. The present disclosure is not limited to this.

For example, the physical cells configured and associated with the serving cell 1 are the physical cell 1 and the physical cell 2. The measurement result of the physical cell 1 is the measurement result 1, and the measurement result of the physical cell 2 is the measurement result 2. In response to measurement indication information sent by the network device indicating to report the measurement result of the physical cell 1, the terminal device may report the measurement result 1 of the physical cell 1, etc. The present disclosure is not limited to this.

In some embodiments, the terminal device may report a measurement result greater than a preset threshold.

The threshold may be configured by the network device, or agreed a protocol. The present disclosure does not limit to this.

For example, the physical cells configured and associated with the serving cell 1 are the physical cell 1 and the physical cell 2. The measurement result of the physical cell 1 is the measurement result 1, and the measurement result of the physical cell 2 is the measurement result 2. In response to the measurement result 1 of the physical cell 1 being greater than the preset threshold T configured by the network device or agreed by the protocol, and the measurement result 2 of the physical cell 2 being less than the preset threshold T, the terminal device may report the measurement result 1 of the physical cell 1, etc. The present disclosure is not limited to this.

In some embodiments, the plurality of measurement results are merged and a merged measurement result is recorded as a measurement result of the serving cell, and the measurement result of the serving cell is reported.

For example, the physical cells configured and associated with the serving cell 1 are the physical cell 1 and the physical cell 2. The measurement result of the physical cell 1 is the measurement result 1, and the measurement result of the physical cell 2 is the measurement result 2. The terminal device may merge and record the measurement result 1 and the measurement result 2, for example, obtain an average value of the measurement result 1 of the physical cell 1 and the measurement result 2 of the physical cell 2 after adding the measurement result 1 and the measurement result 2, and take the average value as the measurement result of the serving cell, and reports the measurement result of the serving cell, etc. The present disclosure is not limited to this.

With implementing embodiments of the present disclosure, the terminal device may first determine the serving cell, and report the measurement result of the physical cell, which meets the condition, selected from the plurality of physical cells according to the plurality of physical cells configured for the serving cell. Therefore, the present disclosure may cause the terminal device and the network device to maintain a consistent understanding for measurement of the physical cells associated with the serving cell of the terminal device, which may provide a guarantee for a smooth and steady communication transmission.

Figure 7:
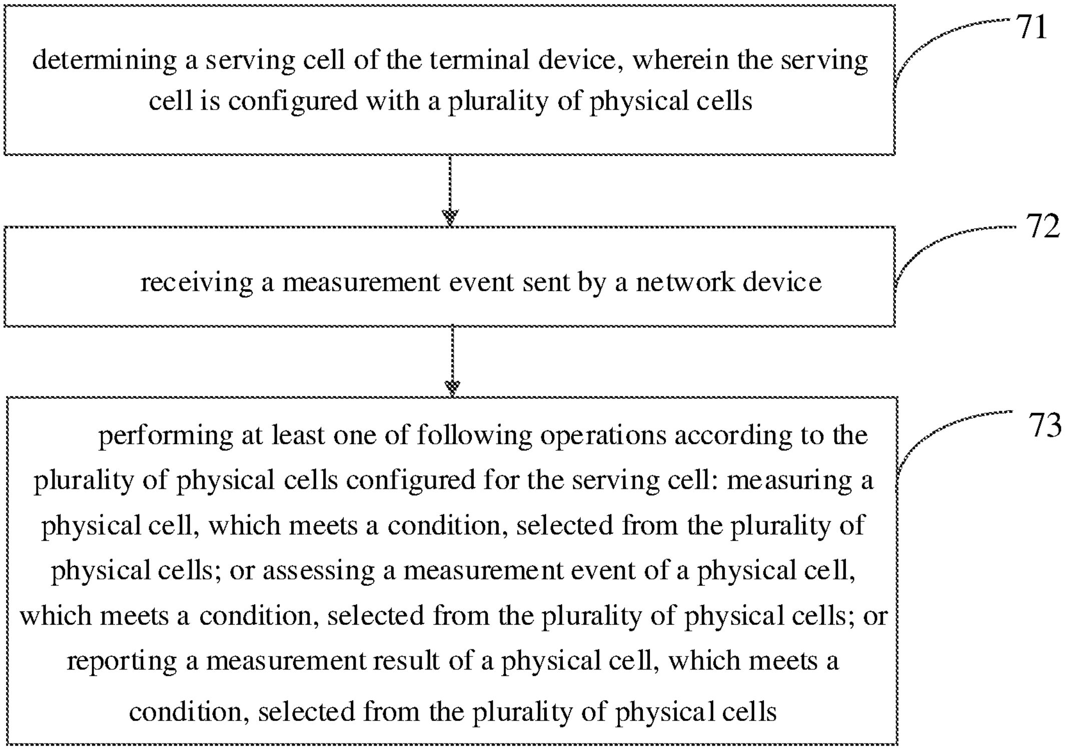
FIG. 7 is a flowchart illustrating a method for serving cell measurement according to another embodiment of the present disclosure.

Please referring to FIG. 7, FIG. 7 is a flowchart illustrating a method for serving cell measurement according to an embodiment of the present disclosure. The method may be performed by a terminal device. As illustrated in FIG. 7, the method may include, but is not limited to, the following blocks.

At block 71, a serving cell of the terminal device is determined. The serving cell is configured with a plurality of physical cells.

It is noted that specific contents and implementations of block 71 may refer to explanations of other respective embodiments of the present disclosure, which will be repeated hereinafter.

At block 72, a measurement event sent by a network device is received.

In some embodiments, a type of the measurement event may include a serving cell measurement result exceeding a first threshold value.

The first threshold value may be a value configured by a network device or a value agreed in a protocol. The present disclosure does not limit this.

In some embodiments, the type of the measurement event may include the serving cell measurement result being lower than a second threshold value.

The second threshold value may be a value configured by the network device or a value agreed in the protocol. The present disclosure does not limit this.

In some embodiments, the type of the measurement event may include a neighboring cell measurement result being greater than a first specified value of a special cell (SpCell) measurement result.

The first specified value may be a value configured by the network device or a value agreed in the protocol. The present disclosure does not limit this.

In some embodiments, the type of the measurement event may include the neighboring cell measurement result being higher than a third threshold value.

The third threshold value may be a value configured by the network device or a value agreed in the protocol. The present disclosure does not limit this.

In some embodiments, the type of the measurement event may include the SpCell measurement result being lower than a fourth threshold value, and the neighboring cell measurement result being higher than a fifth threshold value.

The fourth threshold value and the fifth threshold value may be values configured by the network device or values agreed in the protocol. The present disclosure does not limit this.

In some embodiments, the type of the measurement event may include the neighboring cell measurement result being higher than a second specified value of a secondary cell (SCell) measurement result.

The second specified value may be a value configured by the network device or a value agreed in the protocol. The present disclosure does not limit this.

In some embodiments, the type of the measurement event may include an inter radio access technology (inter-RAT) neighboring cell measurement result being higher than a sixth threshold value.

The sixth threshold value may be a value configured by the network device or a value agreed in the protocol. The present disclosure does not limit this.

In some embodiments, the type of the measurement event may include a primary cell (PCell) measurement result being lower than a seventh threshold value, and the inter-RAT neighboring cell measurement result being higher than an eighth threshold value.

The seventh threshold value and the eighth threshold value may be values configured by the network device or values agreed in the protocol. The present disclosure does not limit this.

In some embodiments, the type of the measurement event may include an interference exceeding a ninth threshold value.

The ninth threshold value may be a value configured by the network device or a value agreed in the protocol. The present disclosure does not limit this.

In some embodiments, the type of the measurement event may include a channel busy rate of a new radio sidelink (NR sidelink) exceeding a tenth threshold value.

The tenth threshold value may be a value configured by the network device or a value agreed in the protocol. The present disclosure does not limit this.

In some embodiments, the type of the measurement event may include the channel busy rate of the NR sidelink being lower than an eleventh threshold value.

The eleventh threshold value may be a value configured by the network device or a value agreed in the protocol. The present disclosure does not limit this.

It is understood that the PCell, the SCell, the PSCell, and the SpCell are different types of serving cells.

It is understood that the type of the measurement event may be one or more of the above items. The present disclosure does not limit this.

It should be noted that the block 71 can be executed first and then the block 72 can be executed, or the block 72 can be executed first and then the block 71 can be executed, or the blocks 71 and 72 can be executed in parallel, etc. The present disclosure does not limit this.

At block 73, at least one of following operations is performed according to the plurality of physical cells configured for the serving cell: measuring a physical cell, which meets a condition, selected from the plurality of physical cells; or assessing a measurement event of a physical cell, which meets a condition, selected from the plurality of physical cells; or reporting a measurement result of a physical cell, which meets a condition, selected from the plurality of physical cells.

It can be understood that by merging the plurality of measurement results and recording the merged result as the measurement result of the serving cell, it may assess whether the measurement event is triggered, etc. The present disclosure is not limited to this.

For example, the plurality of measurement results are merged and recorded, and the obtained measurement result of the serving cell is the measurement result 1 of the serving cell, it may assess whether the measurement result 1 of the serving cell exceeds the first threshold value. In response to the measurement event being triggered, the measurement result 1 may be reported, etc. The present disclosure is not limited to this.

It can be understood that when one of the above measurement events is triggered, the measurement result may be reported, or when the plurality of measurement events are triggered, the measurement results may be reported. The present disclosure does not limit this.

It is noted that specific contents and implementations of block 73 may refer to explanations of other respective embodiments of the present disclosure, which will be repeated hereinafter.

With implementing embodiments of the present disclosure, the terminal device may first determine the serving cell, receive the measurement event sent by the network device, and perform at least one of the following operations according to the plurality of physical cells configured for the serving cell: measuring the physical cell, which meets the condition, selected from the plurality of physical cells: or assessing the measurement event of the physical cell, which meets the condition, selected from the plurality of physical cells; or reporting the measurement result of the physical cell, which meets the condition, selected from the plurality of physical cells. Therefore, the present disclosure may cause the terminal device and the network device to maintain a consistent understanding for measurement of the physical cells associated with the serving cell of the terminal device, which may provide a guarantee for a smooth and steady communication transmission.

Figure 8:
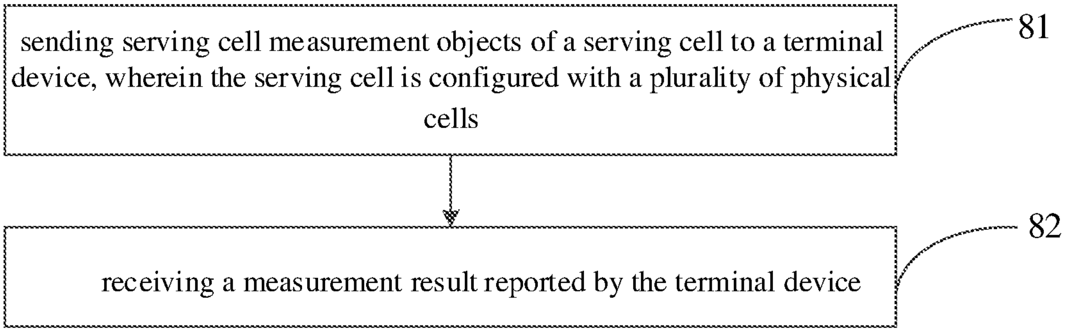
FIG. 8 is a flowchart illustrating a method for serving cell measurement according to another embodiment of the present disclosure.

Please referring to FIG. 8, FIG. 8 is a flowchart illustrating a method for serving cell measurement according to an embodiment of the present disclosure. The method may be performed by a network device. As illustrated in FIG. 8, the method may include, but is not limited to, the following blocks.

At block 81, serving cell measurement objects of a serving cell are sent to a terminal device. The serving cell is configured with a plurality of physical cells.

The serving cell measurement objects may include reference signal information for measurement. The present disclosure is not limited to this.

In some embodiments, reference signal information may include measuring a frequency point. For example, the frequency point may be ARFCN 1. Alternatively, the reference signal information may include measuring a type of a reference signal. For example, the type of the reference signal may be an SSB, or may also be a CSI RS, etc., which is not limited in the present disclosure.

In an embodiment of the present disclosure, the network device may send the serving cell measurement objects of the serving cell to the terminal device, such that the terminal device may obtain the serving cell measurement objects of the serving cell. Therefore, the terminal device may maintain a consistent understanding with the network device when measuring the physical cells configured and associated with the serving cell, which may provide a guarantee for a communication transmission.

In some embodiments, the network device may configure messages through radio resource control (RRC) to send the serving cell measurement objects of the serving cell to the terminal device.

For example, the network device can configure the messages through RRC to indicate to the terminal device the measurement object 1 of the serving cell 1, etc. The present disclosure is not limited to this.

In some embodiments, the network device may also configure frequency point information of the physical cells associated with the serving cell to the terminal device, so that the terminal device may obtain identifier information of the physical cells, etc. The present disclosure is not limited to this.

At block 82, a measurement result reported by the terminal device is received.

In some embodiments, the measurement result may include a plurality of measurement results corresponding to the plurality of physical cells, or a measurement result of the serving cell, specific content and implementation of which may refer to other respective embodiment of the present disclosure, which will not be repeated herein.

In some embodiments, the plurality of measurement results may include any one of: cell level measurement results; or measurement results of beams corresponding to cells, specific content and implementation of which may refer to other respective embodiment of the present disclosure, which will not be repeated herein.

In some embodiments, the network device may receive the measurement results reported by the terminal device at certain time intervals or frequencies, or may also receive the measurement results reported by the terminal device in real-time, or may also receive the measurement results reported by the terminal device in other means, etc. The present disclosure is not limited to this.

With implementing embodiments of the present disclosure, the network device may send the serving cell measurement objects of the serving cell to the terminal device, and then receive the measurement result reported by the terminal device. Therefore, the present disclosure may cause the terminal device and the network device to maintain a consistent understanding for measurement of the physical cells associated with the serving cell of the terminal device, which may provide a guarantee for a smooth and steady communication transmission.

Figure 9:
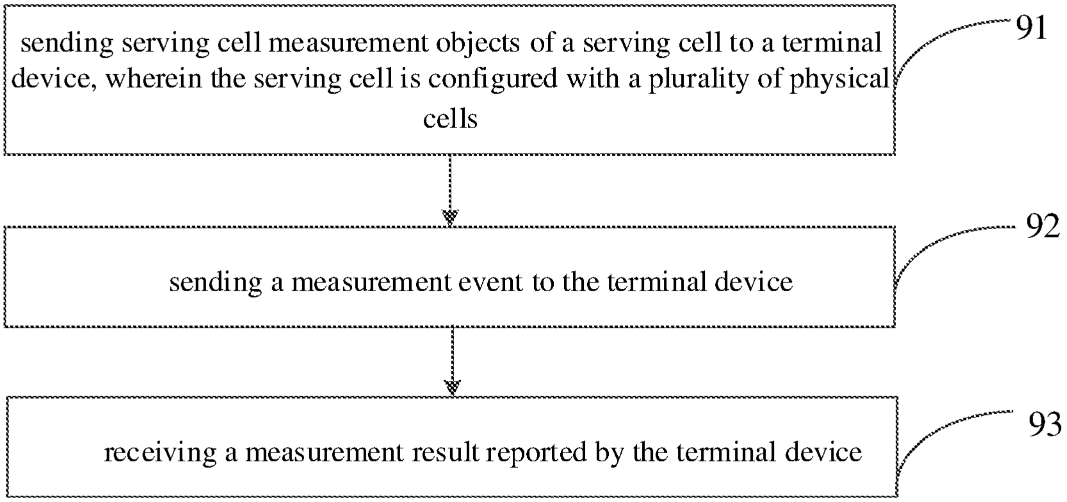
FIG. 9 is a flowchart illustrating a method for serving cell measurement according to another embodiment of the present disclosure.

Please referring to FIG. 9, FIG. 9 is a flowchart illustrating a method for serving cell measurement according to an embodiment of the present disclosure. The method may be performed by a network device. As illustrated in FIG. 9, the method may include, but is not limited to, the following blocks.

At block 91, serving cell measurement objects of a serving cell are sent to a terminal device. The serving cell is configured with a plurality of physical cells.

It is noted that specific contents and implementations of block 91 may refer to explanations of other respective embodiments of the present disclosure, which will be repeated hereinafter.

In some embodiments, the network device may also send a configuration indication to the terminal device, such that the terminal device may obtain the specified physical cells to be measured based on the configuration indication, such that the terminal device and the network device can maintain a consistent understanding for measurement of the physical cells.

In some embodiments, the network device may send the configuration indication to the terminal device through a RRC, or may also send the configuration indication to the terminal device through other means, etc. The present disclosure is not limited to this.

At block 92, a measurement event is sent to the terminal device.

In some embodiments, a type of the measurement event may include a serving cell measurement result exceeding a first threshold value.

The first threshold value may be a value agreed in a protocol, or determined through a negotiation between the network device and the terminal device. The present disclosure does not limit this.

In some embodiments, the type of the measurement event may include the serving cell measurement result being lower than a second threshold value.

The second threshold value may be the value agreed in a protocol, or determined through the negotiation between the network device and the terminal device. The present disclosure does not limit this.

In some embodiments, the type of the measurement event may include a neighboring cell measurement result being greater than a first specified value of a special cell (SpCell) measurement result.

The first specified value may be a value agreed in a protocol, or determined through a negotiation between the network device and the terminal device. The present disclosure does not limit this.

In some embodiments, the type of the measurement event may include the neighboring cell measurement result being higher than a third threshold value.

The third threshold value may be the value agreed in the protocol, or determined through the negotiation between the network device and the terminal device. The present disclosure does not limit this.

In some embodiments, the type of the measurement event may include the SpCell measurement result being lower than a fourth threshold value, and the neighboring cell measurement result being higher than a fifth threshold value.

The fourth threshold value and the fifth threshold value may be values agreed in the protocol, or determined through the negotiation between the network device and the terminal device. The present disclosure does not limit this.

In some embodiments, the type of the measurement event may include the neighboring cell measurement result being higher than a second specified value of a secondary cell (SCell) measurement result.

The second specified value may be the value agreed in a protocol, or determined through the negotiation between the network device and the terminal device. The present disclosure does not limit this.

In some embodiments, the type of the measurement event may include an inter radio access technology (inter-RAT) neighboring cell measurement result being higher than a sixth threshold value.

The sixth threshold value may be the value agreed in a protocol, or determined through the negotiation between the network device and the terminal device. The present disclosure does not limit this.

In some embodiments, the type of the measurement event may include a primary cell (PCell) measurement result being lower than a seventh threshold value, and the inter-RAT neighboring cell measurement result being higher than an eighth threshold value.

The seventh threshold value and the eighth threshold value may be the values agreed in a protocol, or determined through the negotiation between the network device and the terminal device. The present disclosure does not limit this.

In some embodiments, the type of the measurement event may include an interference exceeding a ninth threshold value.

The ninth threshold value may be the value agreed in a protocol, or determined through the negotiation between the network device and the terminal device. The present disclosure does not limit this.

In some embodiments, the type of the measurement event may include a channel busy rate of a new radio sidelink (NR sidelink) exceeding a tenth threshold value.

The tenth threshold value may be the value agreed in a protocol, or determined through the negotiation between the network device and the terminal device. The present disclosure does not limit this.

In some embodiments, the type of the measurement event may include the channel busy rate of the NR sidelink being lower than an eleventh threshold value.

The eleventh threshold value may be the value agreed in a protocol, or determined through the negotiation between the network device and the terminal device. The present disclosure does not limit this.

It is understood that the PCell, the SCell, the PSCell, and the SpCell are different types of serving cells.

It is understood that the type of the measurement event may be one or more of the above items. The present disclosure does not limit this.

It should be noted that the block 91 can be executed first and then the block 92 can be executed, or the block 92 can be executed first and then the block 91 can be executed, or the blocks 91 and 92 can be executed in parallel, etc. The present disclosure does not limit this.

At block 93, a measurement result reported by the terminal device is received.

It is noted that specific contents and implementations of block 93 may refer to explanations of other respective embodiments of the present disclosure, which will be repeated hereinafter.

With implementing embodiments of the present disclosure, the network device may send the serving cell measurement objects of the serving cell to the terminal device, and then send the measurement event to the terminal device, and further receive the measurement result reported by the terminal device. Therefore, the present disclosure may cause the terminal device and the network device to maintain a consistent understanding for measurement of the physical cells associated with the serving cell of the terminal device, which may provide a guarantee for a smooth and steady communication transmission.

In embodiments provided in the present disclosure, the method proposed in the present disclosure is introduced from perspectives of the network device and the terminal device. In order to achieve functions of the method proposed in embodiments of the present disclosure, the network device and the terminal device may include hardware structures and software modules, to achieve the above functions in form of hardware structures, software modules, or a combination of hardware structures and software modules. One of the above functions can be executed in the form of hardware structures, software modules, or the combination of hardware structures and software modules.

Figure 10:
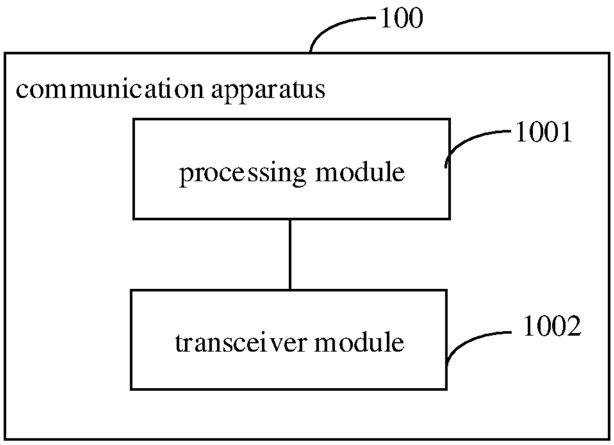
FIG. 10 is a block diagram illustrating a structure of a communication apparatus according to an embodiment of the present disclosure.

FIG. 10 is a block diagram illustrating a communication apparatus 100 according to an embodiment of the present disclosure. As illustrated in FIG. 10, the communication apparatus 100 may include a processing module 1001 and a transceiver module 1002.

The transceiver module 1002 may include a sending module and/or a receiving module. The sending module is configured to achieve a sending function, and the receiving module is configured to achieve a receiving function. The transceiver module 1002 may achieve the sending function and/or the receiving function.

It may be understood that the communication apparatus 100 may be a terminal device, or an apparatus in the terminal device, or an apparatus that can be matched and used with the terminal device.

The communication apparatus 100 is at a terminal device side. The apparatus includes:

a processing module 1001, configured to determine a serving cell of the apparatus. The serving cell is configured with a plurality of physical cells.

The processing module 1001 is configured to perform at least one of following operations according to the plurality of physical cells configured for the serving cell:

measuring a physical cell, which meets a condition, selected from the plurality of physical cells; or assessing a measurement event of a physical cell, which meets a condition, selected from the plurality of physical cells; or reporting a measurement result of a physical cell, which meets a condition, selected from the plurality of physical cells.

In some embodiments, the processing module 1001 is specifically configured to:

obtain serving cell measurement objects of the serving cell;

measure reference signals of the plurality of physical cells in response to the serving cell measurement objects including reference signals; or perform no measurement on a reference signal of an unactivated physical cell in response to the serving cell measurement objects including a reference signal of one or more physical cells.

In some embodiments, the processing module 1001 is specifically configured to:

perform no measurement for an unactivated physical cell in the one or more physical cells corresponding to the serving cell measurement objects.

In some embodiments, the unactivated physical cell includes:

a physical cell being not activated or enabled;

one or more physical channels corresponding to a physical cell being not activated or enabled In some embodiments, the physical cell which meets the condition includes:

a physical cell specified through a configuration of a network device; or a physical cell agreed in a protocol, in which, the physical cell agreed in the protocol is an activated physical cell, or a physical cell with one or more physical channels being activated.

In some embodiments, the serving cell corresponds to a plurality of serving cell measurement objects, and the physical cell, which meets the condition, corresponding to a measurement object of an activated serving cell is measured.

In some embodiments, in response to the plurality of physical cells being inter-frequency measurement cells, the processing module 1001 is further configured to:

determine a target physical cell;

when the target physical cell is an inter-frequency measurement cell for an activated physical cell, perform measurement using a measurement spacing; or when the target physical cell is the inter-frequency measurement cell for the activated physical cell, and a frequency point of the target physical cell belongs to a same frequency type as a frequency point of the activated physical cell, perform measurement using a measurement spacing corresponding to the frequency type.

In some embodiments, the target physical cell and the activated physical cell are the inter-frequency measurement cells when having at least one of following characteristics:

different frequency points;

different bandwidths;

different subcarrier spacings.

In some embodiments, the processing module 1001 is further configured to:

when the plurality of physical cells are detected and the plurality of physical cells are the plurality of associated physical cells configured by the serving cell, obtain a plurality of measurement results of the plurality of physical cells; and record the plurality of measurement results of the plurality of physical cells.

In some embodiments, the processing module 1001 is further specifically configured to:

record the plurality of measurement results respectively; and merge the plurality of measurement results to generate and record a measurement result of the serving cell.

In some embodiments, the plurality of measurement results of the plurality of physical cells includes any one of:

cell level measurement results; or measurement results of beams corresponding to cells.

In some embodiments, the apparatus further includes a transceiver module 1002, configured to:

report a measurement result of an activated physical cell among physical cells associated with the serving cell;

report a measurement result of a physical cell with a corresponding physical channel being activated among the physical cells associated with the serving cell;

report a plurality of measurement results corresponding to the plurality of physical cells associated with the serving cell respectively;

report a measurement result of the physical cell specified by a measurement indication according to the measurement indication received;

report a measurement result greater than a preset threshold;

merge the plurality of measurement results and recording a merged measurement result as a measurement result of the serving cell, and report the measurement result of the serving cell.

In some embodiments, the apparatus further includes a transceiver module 1002, configured to:

receive a measurement event sent by a network device.

In some embodiments, a type of the measurement event includes at least one of:

a serving cell measurement result exceeding a first threshold value;

the serving cell measurement result being lower than a second threshold value;

a neighboring cell measurement result being greater than a first specified value of a special cell (SpCell) measurement result;

the neighboring cell measurement result being higher than a third threshold value;

the SpCell measurement result being lower than a fourth threshold value, and the neighboring cell measurement result being higher than a fifth threshold value;

the neighboring cell measurement result being higher than a second specified value of a secondary cell (SCell) measurement result;

an inter radio access technology (inter-RAT) neighboring cell measurement result being higher than a sixth threshold value;

a primary cell (PCell) measurement result being lower than a seventh threshold value, and the inter-RAT neighboring cell measurement result being higher than an eighth threshold value;

an interference exceeding a ninth threshold value;

a channel busy rate of a new radio sidelink (NR sidelink) exceeding a tenth threshold value;

the channel busy rate of the NR sidelink being lower than an eleventh threshold value;

in which, the PCell, the SCell, a primary secondary cell (PSCell), and the SpCell are different types of serving cells.

The communication apparatus provided in the present disclosure may first determine the serving cell, and perform at least one of the following operations according to the plurality of physical cells configured for the serving cell: measuring the physical cell, which meets the condition, selected from the plurality of physical cells; or assessing the measurement event of the physical cell, which meets the condition, selected from the plurality of physical cells; or reporting the measurement result of the physical cell, which meets the condition, selected from the plurality of physical cells. Therefore, the present disclosure may cause the terminal device and the network device to maintain a consistent understanding for measurement of the physical cells associated with the serving cell of the terminal device, which may provide a guarantee for a smooth and steady communication transmission.

It is understood that the communication apparatus 100 may be a network device, an apparatus within the network device, or an apparatus that can be matched and used with the network device.

The communication apparatus 100 is at a network device side. The apparatus includes:

a transceiver module 1002, configured to send serving cell measurement objects of a serving cell to a terminal device. The serving cell is configured with a plurality of physical cells.

The transceiver module 1002 is configured to receive a measurement result reported by the terminal device.

In some embodiments, the measurement result includes a plurality of measurement results corresponding to the plurality of physical cells, or the measurement result includes a measurement result of the serving cell.

In some embodiments, the plurality of measurement results include any one of:

cell level measurement results; or measurement results of beams corresponding to cells.

In some embodiments, the transceiver module 1002 is further configured to:

send a measurement event to the terminal device.

In some embodiments, a type of the measurement event includes at least one of:

a serving cell measurement result exceeding a first threshold value;

the serving cell measurement result being lower than a second threshold value;

a neighboring cell measurement result being greater than a first specified value of a special cell (SpCell) measurement result;

the neighboring cell measurement result being higher than a third threshold value;

the SpCell measurement result being lower than a fourth threshold value, and the neighboring cell measurement result being higher than a fifth threshold value;

the neighboring cell measurement result being higher than a second specified value of a secondary cell (SCell) measurement result;

an inter radio access technology (inter-RAT) neighboring cell measurement result being higher than a sixth threshold value;

a primary cell (PCell) measurement result being lower than a seventh threshold value, and the inter-RAT neighboring cell measurement result being higher than an eighth threshold value;

an interference exceeding a ninth threshold value;

a channel busy rate of a new radio sidelink (NR sidelink) exceeding a tenth threshold value;

the channel busy rate of the NR sidelink being lower than an eleventh threshold value;

in which, the PCell, the SCell, a primary secondary cell (PSCell), and the SpCell are different types of serving cells.

In some embodiments, the transceiver module 1002 is further configured to:

send a configuration instruction, in which, physical cells to be measured are specified through the configuration instruction.

The communication apparatus provided in the present disclosure may send the serving cell measurement objects of the serving cell to the terminal device, and then receive the measurement result reported by the terminal device. Therefore, the present disclosure may cause the terminal device and the network device to maintain a consistent understanding for measurement of the physical cells associated with the serving cell of the terminal device, which may provide a guarantee for a smooth and steady communication transmission.

Figure 11:
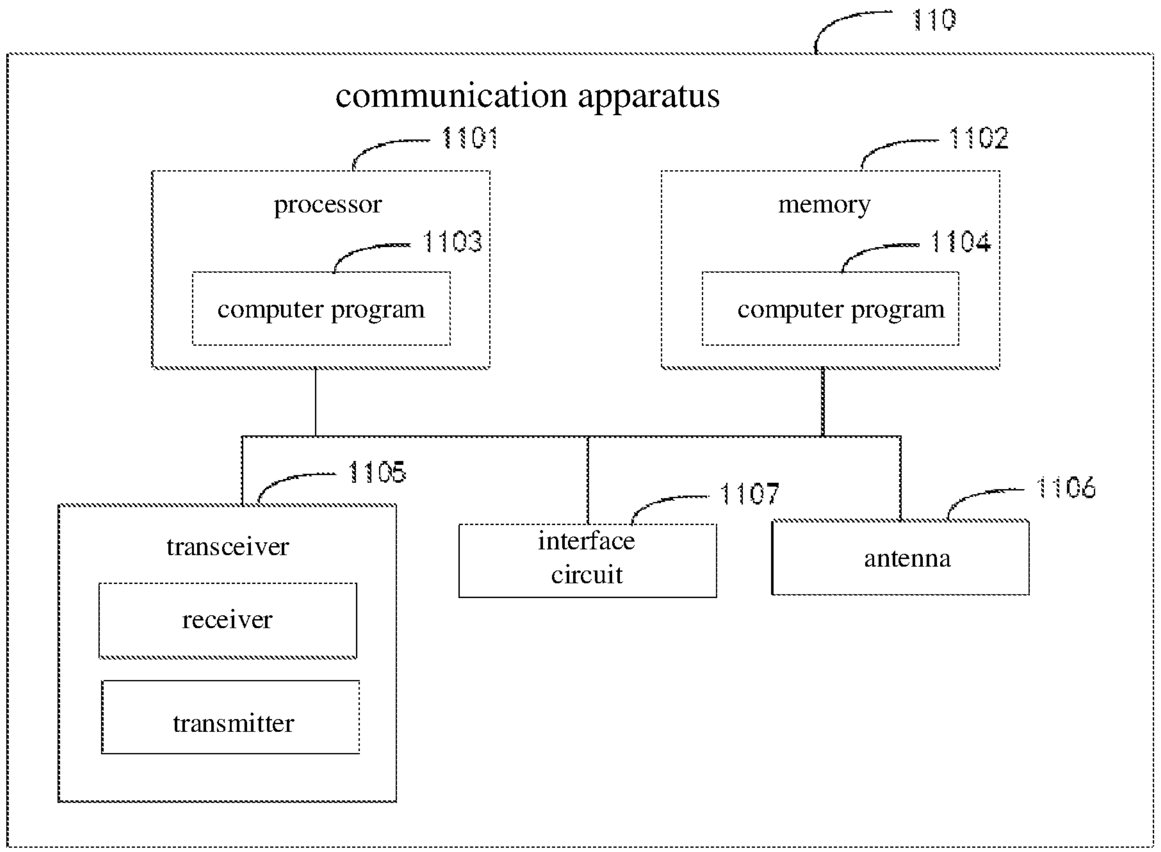
FIG. 11 is a block diagram illustrating a structure of a communication apparatus according to another embodiment of the present disclosure.

FIG. 11 is a block diagram illustrating another communication apparatus 110 provided in another embodiment of the present disclosure. The communication apparatus 110 may be a terminal device, or a chip, a chip system, or a processor that supports a network device to implement the above method, or a chip, a chip system, or a processor that supports the terminal device to implement the above method. This apparatus may be configured to implement the method as described in the above method embodiments, the details of which may refer to illustration of the above method embodiments.

The communication apparatus 110 may include one or more processors 1101. The processor 1101 may be a general-purpose processor, a dedicated processor, or the like. For example, the processor 1101 may be a baseband processor or a central processing unit. The baseband processor may be configured to process a communication protocol and communication data, while the central processor may be configured to control the communication apparatus (such as a base station, a baseband chip, a terminal device, a terminal chip, a DU or a CU, etc.), execute a computer program, and process data from computer program.

In some embodiments, the communication apparatus 110 may further include one or more memories 1102, each with a computer program 1104 stored thereon. The processor 1101 may execute the computer program 1104 to enable the communication apparatus 110 to execute the method as described in the above method embodiments. Optionally, the memory 1102 may further store data. The communication apparatus 110 and the memory 1102 may be set separately or integrated together.

In some embodiments, the communication apparatus 110 may further include a transceiver 1105 and an antenna 1106. The transceiver 1105 may be referred to as a transceiver unit, transceiver, or transceiver circuit, etc., configured to achieve a transceiver function. The transceiver 1105 may include a receiver and a transmitter, and the receiver may be referred to as a receiver or a reception circuit, etc., configured to achieve a reception function; the transmitters may be referred to as a transmitter or a transmission circuit, etc., configured to achieve a transmission function.

In some embodiments, the communication apparatus 110 may also include one or more interface circuits 1007. The interface circuit 1007 is configured to receive code instructions and transmit the code instructions to the processor 1101. The processor 1101 runs the code instructions causing the communication apparatus 110 to execute the method as described in the above method embodiment.

The communication apparatus 110 is a terminal device. The processor 1101 is configured to perform block 21 in FIG. 2; block 22 in FIG. 2; block 31 in FIG. 3; block 32 in FIG. 3; block 33 in FIG. 3; block 41 in FIG. 4; block 42 in FIG. 4; block 43 in FIG. 4; block 44 in FIG. 4; block 51 in FIG. 5; block 52 in FIG. 5; block 53 in FIG. 5; block 54 in FIG. 5; block 61 in FIG. 6; block 71 in FIG. 7; block 72 in FIG. 7; or block 73 in FIG. 7. The transceiver 1105 is configured to perform block 62 in FIG. 6; or block 72 in FIG. 7.

The communication apparatus 110 is a network device. The transceiver 1105 is configured to perform block 81 in FIG. 8; block 82 in FIG. 8; block 91 in FIG. 9; block 92 in FIG. 9; or block 93 in FIG. 9.

In an implementation, processor 1101 may include a transceiver for implementing reception and transmission functions. For example, the transceiver may be a transceiver circuit, an interface, or an interface circuit. The transceiver circuit, the interface, or the interface circuit for achieving the reception and transmission functions may be separate or integrated together. The above-mentioned transceiver circuit, interface or interface circuit may be configured for reading and writing codes/data, or the aforementioned transceiver circuit, interface or interface circuit may be configured for transmitting or transferring of signals.

In an implementation, the processor 1101 may store a computer program 1103. The computer program 1103 may cause communication apparatus 110 to execute the method described in the above method embodiment when running on the processor 1101. The computer program 1103 may be embedded in the processor 1101, in which case the processor 1101 may be implemented by hardware.

In an implementation, the communication apparatus 110 may include a circuit that may achieve functions of sending, receiving, or communicating in the aforementioned method embodiments. The processor and the transceiver described in the present disclosure may be implemented on an integrated circuit (IC), an analog IC, a radio frequency integrated circuit (RFIC), a mixed signal IC, an application specific integrated circuits (ASIC), a printed circuit boards (PCB), an electronic device, and the like. The processor and the transceiver may also be manufactured using various IC process technologies, such as complementary metal oxide semiconductor (CMOS), N-type metal oxide semiconductor (NMOS), P-type metal oxide semiconductor (PMOS), bipolar junction transistor (BJT), bipolar CMOS (BiCMOS), silicon germanium (SiGe), gallium arsenide (GaAs), etc.

The communication apparatus described in the above embodiments may be a network device or a terminal device, but the scope of the communication apparatus described in the present disclosure is not limited to this, and the structure of the communication apparatus may not be limited by FIG. 11. The communication apparatus can be an independent device or can be part of a larger device. For example, the communication apparatus may be:

(1) an independent integrated circuit IC, or a chip, or a chip system or subsystem;

(2) a set of one or more ICs, for example, including a storage element for storing data and the computer program;

(3) an ASIC, such as a modem;

(4) modules that can be embedded in other devices;

(5) a receiver, a terminal, a smart terminal, a cellular phone, a wireless device, a handheld device, a mobile unit, an on-board device, a network device, a cloud device, an artificial intelligence device, etc.;

(6) others and the like.

Figure 12:
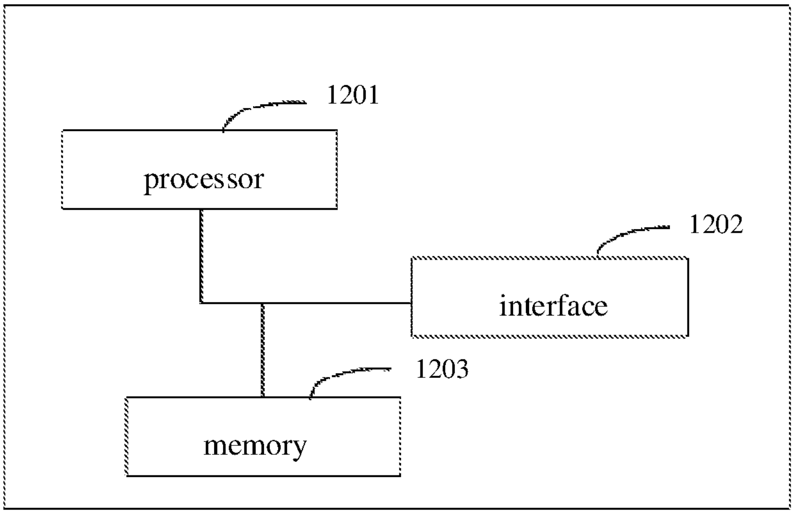
FIG. 12 is a block diagram illustrating a chip according to an embodiment of the present disclosure.

For a case that the communication apparatus is the chip or the chip system, please refer to a schematic diagram of a structure of the chip shown in FIG. 12. The chip shown in FIG. 12 includes a processor 1201 and an interface 1202. A number of processors 1201 may be one or more, and a number of interfaces 1202 may be multiple.

For a case where the chip is configured to implement functions of the terminal device in embodiments of the present disclosure:

the interface 1202 is configured to perform the block 62 in FIG. 6 or the block 72 in FIG. 7.

For a case where the chip is configured to implement functions of the network device in embodiments of the present disclosure:

the interface 902 is configured to perform the block 81 in FIG. 8, the block 82 in FIG. 8, the block 91 in FIG. 9, the block 92 in FIG. 9, or the block 93 in FIG. 9.

In some embodiments, the chip may further include a memory 1203, configured to store a necessary computer program and data.

Those skilled in the art may also understand that various illustrative logical blocks and steps listed in embodiments of the present disclosure can be implemented through electronic hardware, computer software, or a combination thereof. Whether such functions are implemented through hardware or software depends on a specific application and design requirements of an overall system. Those skilled in the art may use various methods to implement functions for each specific application, but such implementation should not be understood as beyond the scope of protection of embodiments of the present disclosure.

The present disclosed embodiment also provides a communication system, which includes a communication apparatus as a terminal device and a communication apparatus as a network device as described in the aforementioned embodiment of FIG. 10, or a communication apparatus as a terminal device and a communication apparatus as a network device as described in the aforementioned embodiment of FIG. 11.

The present disclosure also provides a computer-readable storage medium with instructions stored thereon: the instructions is configured to implement functions of any of the above method embodiments when executed by a computer.

The present disclosure also provides a computer program product, configured to implement functions of any of the above method embodiments when executed by a computer.

All or part of the above embodiments can be implemented through software, hardware, firmware, or any combination thereof. When implemented using the software, all or part of the above embodiments can be implemented in the form of computer program product. The computer program product includes one or more computer programs. When loading and executing the computer programs on a computer, the computer programs may be generated all or part of processes or functions according to embodiments of the present disclosure. The computer can be a general-purpose computer, a specialized computer, a computer network, or other programmable devices. The computer programs can be stored on a computer-readable storage media or transmitted from one computer readable storage medium to another, for example, the computer programs can be transmitted from a website site, a computer, a server or a data center to another website site, computer, server, or data center through wired (such as coaxial cable, fiber optic, digital subscriber line (DSL)) or wireless (such as infrared, wireless, microwave, etc.) methods. The computer-readable storage medium can be any available medium that a computer can access, or a data storage device such as a server including one or more available media integrations or a data center. The available media can be a magnetic media (such as a floppy disk, a hard drive, a magnetic tape), an optical media (such as a high-density digital video disc (DVD)), or a semiconductor media (such as a solid state disk (SSD)), etc.

Those ordinary skilled in the art may understand that first, second, and other numerical numbers involved in the disclosure are distinguished only for convenience of description, and are not intended to limit the scope of embodiments of the present disclosure, nor indicate an order.

At least one in this disclosure can also be described as one or more, and a plurality can be two, three, four, or more, without limitation in this disclosure. In embodiments of the present disclosure, for one type of technical feature, technical features in the type of technical feature are distinguished by “first”, “second”, “third”, “A”, “B”, “C”, and “D”. The technical features described by “first”, “second”, “third”, “A”, “B”, “C”, and “D” are without any order or sequence.

Correspondences shown in respective tables in the present disclosure can be configured or predefined. The values of information in each table are only examples and can be configured as other values, which will not be limited in the present disclosure. When configuring the correspondence between information and various parameters, it is not necessary to configure all the correspondence shown in each table. For example, in the table in the present disclosure, the correspondences shown in certain rows may not be configured. For example, an appropriate deformation adjustment can be made based on the above table, such as splitting, merging, etc. Names of parameters shown in a title of the above table can also use other names that can be understood by the communication apparatus, and the values or representations of the parameters can also use other values or representations that can be understood by the communication apparatus. When implementing the above tables, other data structures can also be used, such as an array, a queue, a container, a stack, a linear table, a pointer, a linked list, a tree, a graph, a structure, a class, a heap, a hash table, or a hash table.

The term predetermined in this disclosure can be understood as defined, predefined, stored, pre-stored, pre-negotiated, pre-configured, cured, or prefired.

Those ordinary skilled in the art can realize that a unit and an algorithm step of each example described in combination with embodiments in the present disclosure can be implemented in electronic hardware, or a combination of computer software and the electronic hardware. Whether such functions are executed in hardware or software depends on specific applications and design constraints of the technical solution. Those skilled may use different methods to implement the described functions for each specific application, but such implementation should not be considered beyond the scope of this disclosure.

Those skilled in the art can clearly understand that for convenience and conciseness of description, specific working processes of the system, device, and unit described above can refer to the corresponding processes in the aforementioned method embodiments, and will not be repeated here.

The above description is only a specific implementation of the disclosure, but the scope of protection of the disclosure is not limited to this. Any changes or replacements that can easily be imagined by any skilled person familiar with the technical field within the scope of the disclosure should be covered within the scope of protection of the disclosure. Therefore, the scope of protection of the disclosure should be based on the scope of protection of claims.

The invention claimed is:

1. A method for serving cell measurement, performed by a terminal device, comprising:
- determining a serving cell of the terminal device, wherein the serving cell is configured with a plurality of physical cells; and
- performing at least one of following operations according to the plurality of physical cells configured for the serving cell:
- measuring a physical cell, which meets a condition, selected from the plurality of physical cells;
- assessing a measurement event of a physical cell, which meets a condition, selected from the plurality of physical cells; or
- reporting a measurement result of a physical cell, which meets a condition, selected from the plurality of physical cells;
- wherein the physical cell which meets the condition comprises: a physical cell agreed in a protocol, wherein the physical cell agreed in the protocol is an activated physical cell, or a physical cell with one or more physical channels being activated;
- wherein the method further comprises:
- obtaining a plurality of measurement results of the plurality of physical cells, wherein the plurality of physical cells are detected and are associated physical cells configured by the serving cell; and
- merging the plurality of measurement results to generate and record a measurement result of the serving cell.

2. The method of claim 1, wherein measuring the physical cell, which meets the condition, selected from the plurality of physical cells comprises:
- obtaining serving cell measurement objects of the serving cell;
- determining that the serving cell measurement objects comprise reference signals, and measuring reference signals of the plurality of physical cells; or
- determining that the serving cell measurement objects comprise a reference signal of one or more physical cells, and performing no measurement on a reference signal of an unactivated physical cell.

3. The method of claim 2, wherein performing no measurement on the reference signal of the unactivated physical cell comprises:
- performing no measurement for an unactivated physical cell in the one or more physical cells corresponding to the serving cell measurement objects.

4. The method of claim 2, wherein the unactivated physical cell comprises:
- a physical cell being not activated or enabled; or one or more physical channels corresponding to a physical cell being not activated or enabled.

5. The method of claim 1, wherein the serving cell corresponds to a plurality of serving cell measurement objects, and the physical cell, which meets the condition, corresponding to a measurement object of an activated serving cell is measured.

6. The method of claim 1, further comprising:

determining that the plurality of physical cells are inter-frequency measurement cells, and determining a target physical cell;

performing measurement using a measurement spacing, wherein the target physical cell is an inter-frequency measurement cell for an activated physical cell; or performing measurement using a measurement spacing corresponding to a frequency type, wherein the target physical cell is the inter-frequency measurement cell for the activated physical cell, and a frequency point of the target physical cell belongs to the same frequency type as a frequency point of the activated physical cell.

7. The method of claim 6, wherein the target physical cell and the activated physical cell are the inter-frequency measurement cells when having at least one of following characteristics:

different frequency points;

different bandwidths; or different subcarrier spacings.

8. The method of claim 1, wherein the plurality of measurement results of the plurality of physical cells comprise any one of:

cell level measurement results; or measurement results of beams corresponding to cells.

9. The method of claim 1, wherein reporting the measurement result of the physical cell, which meets the condition, selected from the plurality of physical cells further comprises at least one of:

reporting a measurement result of an activated physical cell among physical cells associated with the serving cell;

reporting a measurement result of a physical cell with a corresponding physical channel being activated among the physical cells associated with the serving cell;

reporting a plurality of measurement results corresponding to the plurality of physical cells associated with the serving cell respectively;

reporting a measurement result of the physical cell specified by a measurement indication according to the measurement indication received;

reporting a measurement result greater than a preset threshold; or merging the plurality of measurement results and recording a merged measurement result as a measurement result of the serving cell, and reporting the measurement result of the serving cell.

10. The method of claim 1, wherein assessing the measurement event of the physical cell, which meets the condition, selected from the plurality of physical cells further comprises:

receiving a measurement event sent by a network device;

wherein a type of the measurement event comprises at least one of:

a serving cell measurement result exceeding a first threshold value;

the serving cell measurement result being lower than a second threshold value;

a neighboring cell measurement result being greater than a first specified value of a special cell (SpCell) measurement result;

the neighboring cell measurement result being higher than a third threshold value;

the SpCell measurement result being lower than a fourth threshold value, and the neighboring cell measurement result being higher than a fifth threshold value;

the neighboring cell measurement result being higher than a second specified value of a secondary cell (SCell) measurement result;

an inter radio access technology (inter-RAT) neighboring cell measurement result being higher than a sixth threshold value;

a primary cell (PCell) measurement result being lower than a seventh threshold value, and the inter-RAT neighboring cell measurement result being higher than an eighth threshold value;

an interference exceeding a ninth threshold value;

a channel busy rate of a new radio sidelink (NR sidelink) exceeding a tenth threshold value; or the channel busy rate of the NR sidelink being lower than an eleventh threshold value;

wherein the PCell, the SCell, a primary secondary cell (PSCell), and the SpCell are different types of serving cells.

11. A method for serving cell measurement, performed by a network device, comprising:

sending serving cell measurement objects of a serving cell to a terminal device, wherein the serving cell is configured with a plurality of physical cells; and receiving a measurement result reported by the terminal device;

wherein a physical cell, which meets a condition, among the plurality of physical cells comprises: a physical cell agreed in a protocol, wherein the physical cell agreed in the protocol is an activated physical cell, or a physical cell with one or more physical channels being activated;

wherein the measurement result comprises a measurement result of the serving cell, and the measurement result of the serving cell is generated by merging a plurality of measurement results of the plurality of physical cells by the terminal device.

12. The method of claim 11, wherein the plurality of measurement results comprise any one of:

cell level measurement results; or measurement results of beams corresponding to cells.

13. The method of claim 11, further comprising:

sending a measurement event to the terminal device;

wherein a type of the measurement event comprises at least one of:

a serving cell measurement result exceeding a first threshold value;

the serving cell measurement result being lower than a second threshold value;

a neighboring cell measurement result being greater than a first specified value of a special cell (SpCell) measurement result;

the neighboring cell measurement result being higher than a third threshold value;

the SpCell measurement result being lower than a fourth threshold value, and the neighboring cell measurement result being higher than a fifth threshold value;

the neighboring cell measurement result being higher than a second specified value of a secondary cell (SCell) measurement result;

an inter radio access technology (inter-RAT) neighboring cell measurement result being higher than a sixth threshold value;

a primary cell (PCell) measurement result being lower than a seventh threshold value, and the inter-RAT neighboring cell measurement result being higher than an eighth threshold value;

an interference exceeding a ninth threshold value;

a channel busy rate of a new radio sidelink (NR sidelink) exceeding a tenth threshold value; or the channel busy rate of the NR sidelink being lower than an eleventh threshold value;

wherein the PCell, the SCell, a primary secondary cell (PSCell), and the SpCell are different types of serving cells.

14. A network device, comprising:

a processor; and a memory having a computer program stored thereon, wherein the processor is configured to perform the method according to claim 11.

15. A terminal device, comprising:

a processor; and a memory having a computer program stored thereon, wherein the processor is configured to:

determine a serving cell of the terminal device, wherein the serving cell is configured with a plurality of physical cells; and perform at least one of following operations according to the plurality of physical cells configured for the serving cell:

measuring a physical cell, which meets a condition, selected from the plurality of physical cells;

assessing a measurement event of a physical cell, which meets a condition, selected from the plurality of physical cells; or reporting a measurement result of a physical cell, which meets a condition, selected from the plurality of physical cells;

wherein the physical cell which meets the condition comprises: a physical cell agreed in a protocol, wherein the physical cell agreed in the protocol is an activated physical cell, or a physical cell with one or more physical channels being activated;

wherein the processor is configured to:

obtain a plurality of measurement results of the plurality of physical cells, wherein the plurality of physical cells are detected and are associated physical cells configured by the serving cell; and merge the plurality of measurement results to generate and record a measurement result of the serving cell.

* * * * *